United States Patent
Futagi et al.

(10) Patent No.: US 7,251,272 B2
(45) Date of Patent: Jul. 31, 2007

(54) RADIO COMMUNICATION APPARATUS AND CHANNEL ESTIMATING METHOD

(75) Inventors: Sadaki Futagi, Ishikawa-gun (JP); Mitsuru Uesugi, Yokosuka (JP); Tadashi Matsumoto, Ebina (JP)

(73) Assignees: Panasonic Mobile Communications Co., Ltd., Kanagawa (JP); NTT DoCoMo, Inc., Tokyo (JP)

( * ) Notice: Subject to any disclaimer, the term of this patent is extended or adjusted under 35 U.S.C. 154(b) by 1388 days.

(21) Appl. No.: 09/933,038

(22) Filed: Aug. 21, 2001

(65) Prior Publication Data
US 2002/0025783 A1 Feb. 28, 2002

(30) Foreign Application Priority Data
Aug. 30, 2000 (JP) ............... 2000-260833

(51) Int. Cl.
*H03H 7/30* (2006.01)
(52) U.S. Cl. .................. 375/229; 375/266; 455/69
(58) Field of Classification Search ............... 375/229, 375/230, 232, 233, 266; 455/69
See application file for complete search history.

(56) References Cited
U.S. PATENT DOCUMENTS
5,357,257 A * 10/1994 Nevin .................. 342/165
6,714,587 B1 * 3/2004 Van Houtum et al. ...... 375/220

OTHER PUBLICATIONS

Partial English translation of the document "Signal Transmission Performance of Spatial and Temporal Pre-Cording in TDD Mobile Communication Systems" cited in the Information Disclosure Statement of Aug. 21, 2001.
Hiroshi Harashima, et al. "Matched-Transmission Technique for Channels with Intersymbol Interference", IEEE Transactions on Communications, vol. com -20, No. 4, p. 774-780, Aug. 1972.
Shigeru Tomisato, et al. "Signal Transmission Performance of Spatial and Temporal Pre-Coding in TDD Mobile Communication Systems", NTT Mobile Communications Network Inc., pp. 540-541, 1998.

* cited by examiner

*Primary Examiner*—Lee Nguyen
(74) *Attorney, Agent, or Firm*—Stevens, Davis, Miller & Mosher, LLP

(57) ABSTRACT

Noise generating section 106 generates noise data of a white Gaussian noise, and noise adding section 107 adds received data and the noise data. Channel estimating section 108 performs channel estimation using the added data output from noise adding section 107. At this point, when a level of a preceding signal is equal to or less than that of the noise data, channel estimating section 108 is not capable of detecting the preceding signal. Accordingly, in the case where a received level of a preceding signal is extremely lower than that of a delayed signal and a noise level is further lower than the received level of the preceding signal, it is possible to perform pre-equalization using the delayed signal as a desired signal, whereby it is possible to maintain the reception characteristic of a communication partner.

4 Claims, 11 Drawing Sheets

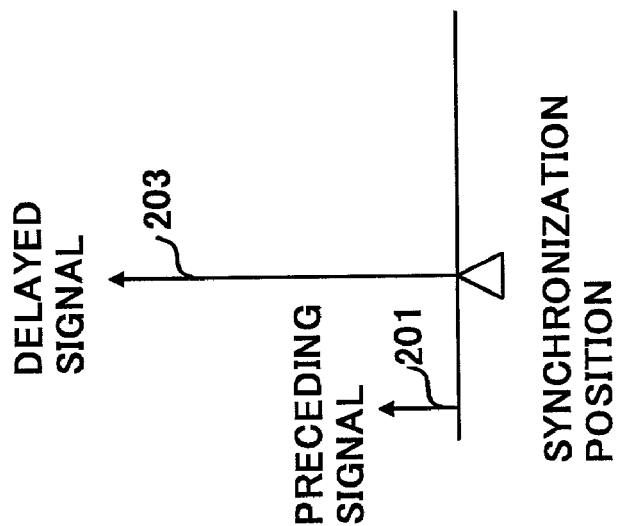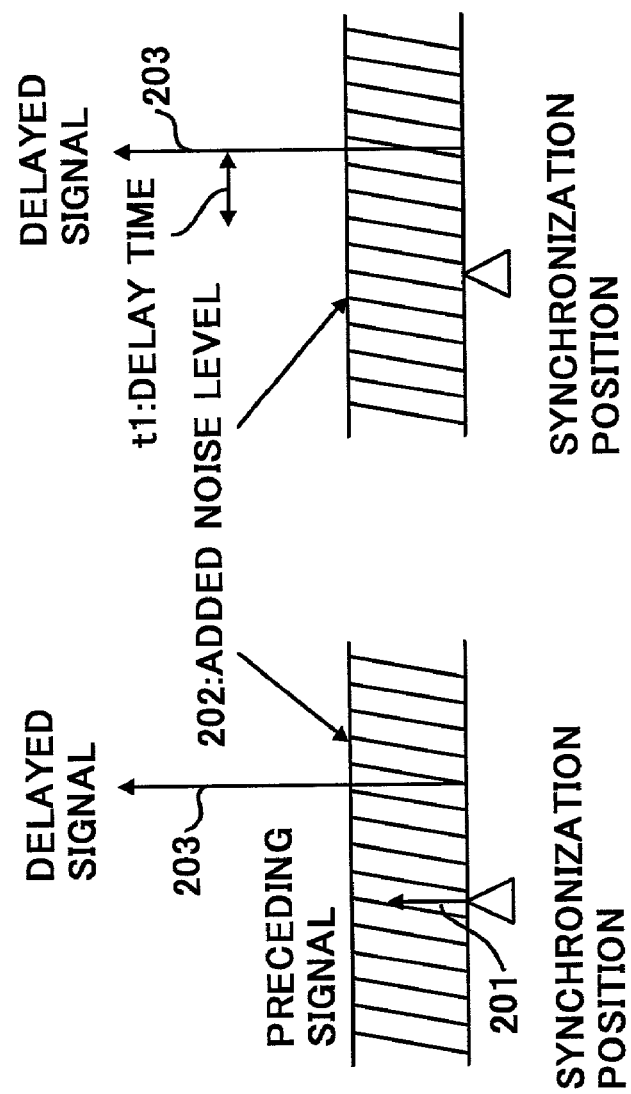

RADIO COMMUNICATION APPARATUS AND CHANNEL ESTIMATING METHOD

BACKGROUND OF THE INVENTION

1. Field of the Invention

The present invention relates to a radio communication apparatus and channel estimating method applied to a communication terminal apparatus and base station apparatus that perform pre-equalization used in a digital mobile communication system.

2. Description of the Related Art

FIG. 1 is a block diagram illustrating a configuration of a conventional radio communication apparatus. Radio communication apparatus 10 illustrated in FIG. 1 is principally comprised of pre-equalization processing section 11, DA conversion section 12, radio section 13, antenna 14, AD conversion section 15 and channel estimating section 16.

A signal received at antenna 14 is subjected to the predetermined radio processing at radio section 13, and the resultant signal is converted into a digital signal at AD conversion section 15 to be output to channel estimating section 16. Channel estimating section 16 estimates a channel condition at the time of reception, i.e., a multipath condition from the digital signal, and outputs channel information indicative of the estimation contents to pre-equalization processing section 11. Pre-equalization processing section 11 performs pre-equalization described later on transmission data using the channel information. The pre-equalization-processed signal is converted into an analog signal at DA conversion section 12, and the analog signal is converted into a radio signal with a carrier frequency at radio section 13 to be transmitted from antenna 14.

With reference to FIGS. 2A to 2C, the pre-equalization will be described next that the conventional radio communication apparatus performs. A received multipath condition is assumed to be a condition in which preceding signal 21 and delayed signal 22 coexist as illustrated in FIG. 2A. In this case, channel estimating section 16 estimates preceding signal 21 and delayed signal 22, and outputs the channel information indicative of the estimation contents to pre-equalization processing section 11. Pre-equalization processing section 11 performs the pre-equalization so that the multipath condition of the received signal at a communication partner apparatus becomes a condition, as illustrated in FIG. 2B, in which preceding signal 21 is left as a desired signal with delayed signal 22 canceled. In addition, in FIG. 2B the broken line indicates the canceled delayed signal.

By thus performing the pre-equalization on the transmission data, the communication partner apparatus is not affected by the multipath at the time of reception, and thereby does not need to perform the equalization, whereby it is made possible for a receiving apparatus with a simple function to obtain received data.

In the radio communication, it is general that a received level of preceding signal 21 is larger than that of delayed signal 22 as illustrated in FIG. 2A. However, as illustrated in FIG. 2C, a case sometimes occurs that a received level of preceding signal 23 is extremely smaller than that of delayed signal 24 depending on propagation environments. In this case, the communication partner apparatus is capable of obtaining a better reception characteristic when the reception processing is performed on delayed signal 24 with a higher received level.

However, in the conventional radio communication apparatus, the channel estimation section always performs the channel estimation such that a preceding signal is a desired signal when a noise level is lower than a received level of the preceding signal, whereby the pre-equalization processing section performs the pre-equalization so as to cancel the delayed signal even in the case as illustrated in FIG. 2C. Therefore, there arises a case that a reception characteristic deteriorates in the communication partner apparatus.

SUMMARY OF THE INVENTION

It is an object of the present invention to provide a radio communication apparatus and channel estimating method capable of improving the reception characteristic of a communication partner apparatus even when a received level of a preceding signal is extremely smaller than that of a delayed signal and a noise level is further smaller than the received level of the preceding signal.

The present invention achieves the above object by performing, when a received level of a preceding signal is extremely smaller than that of a delayed signal, processing such as addition of a noise of some extent on a received signal to disable the preceding signal to be estimated, and performing the pre-equalization using the delayed signal with a high received level as a desired signal.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 4A is a delay profile diagram at the time of reception in the radio communication apparatus according to the first embodiment of the present invention;

FIG. 4B is a delay profile diagram at the time of estimation in the radio communication apparatus according to the first embodiment of the present invention;

FIG. 4C is a delay profile diagram at the time of reception in a communication partner of the radio communication apparatus according to the first embodiment of the present invention;

DETAILED DESCRIPTION OF THE PREFERRED EMBODIMENTS

Embodiments of the present invention will be described below specifically with reference to accompanying drawings.

First Embodiment

Figure 1:
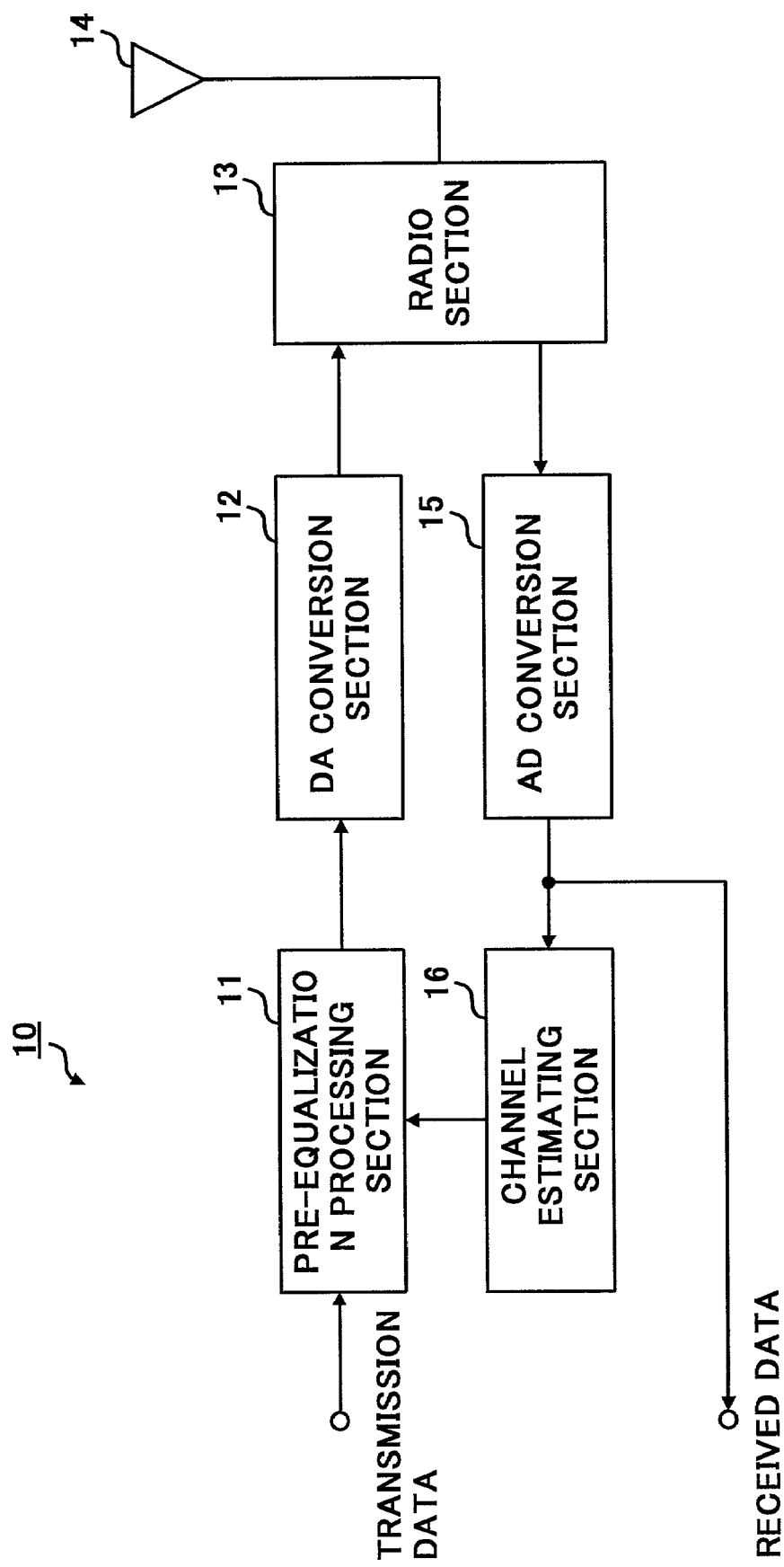
FIG. 1 is a block diagram illustrating a configuration of a conventional radio communication apparatus.
Figure 2:
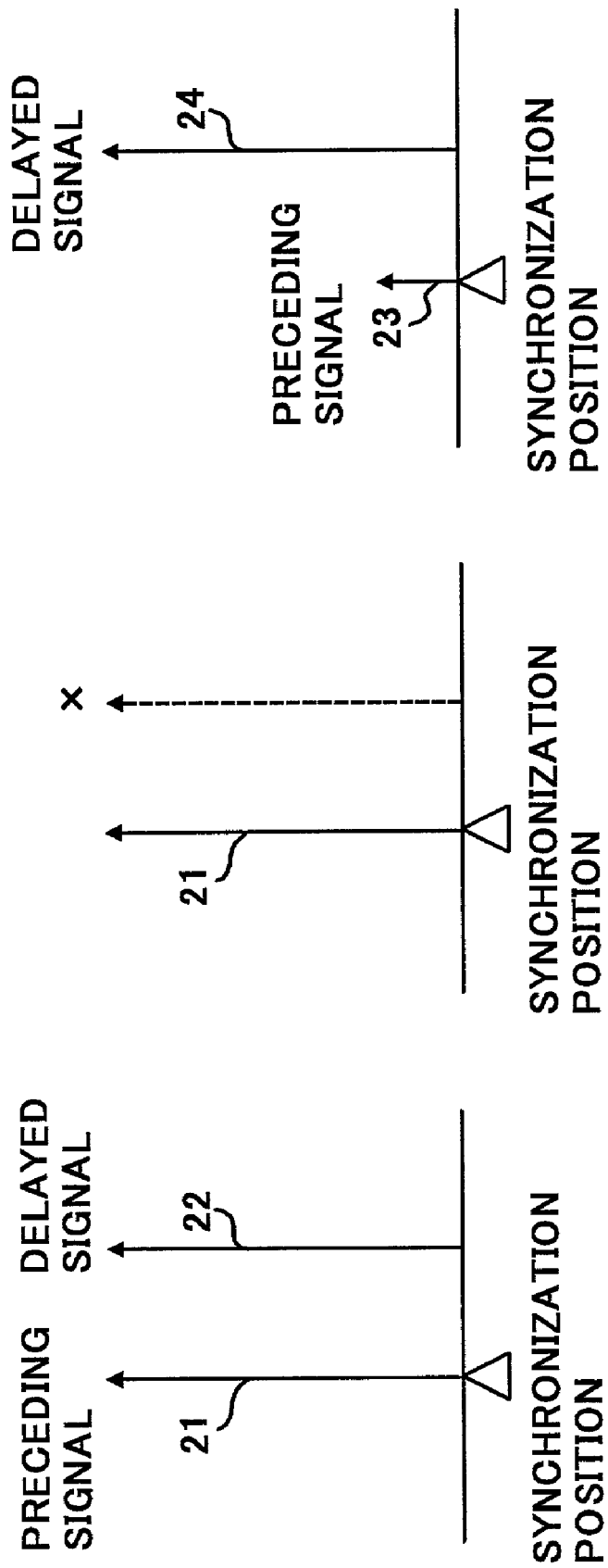
FIG. 2A is a delay profile diagram at the time of reception in the conventional radio communication apparatus.
FIG. 2B is a delay profile diagram at the time of reception in a communication partner of the conventional radio communication apparatus.
FIG. 2C is a delay profile diagram at the time of reception in the conventional radio communication apparatus.
Figure 3:
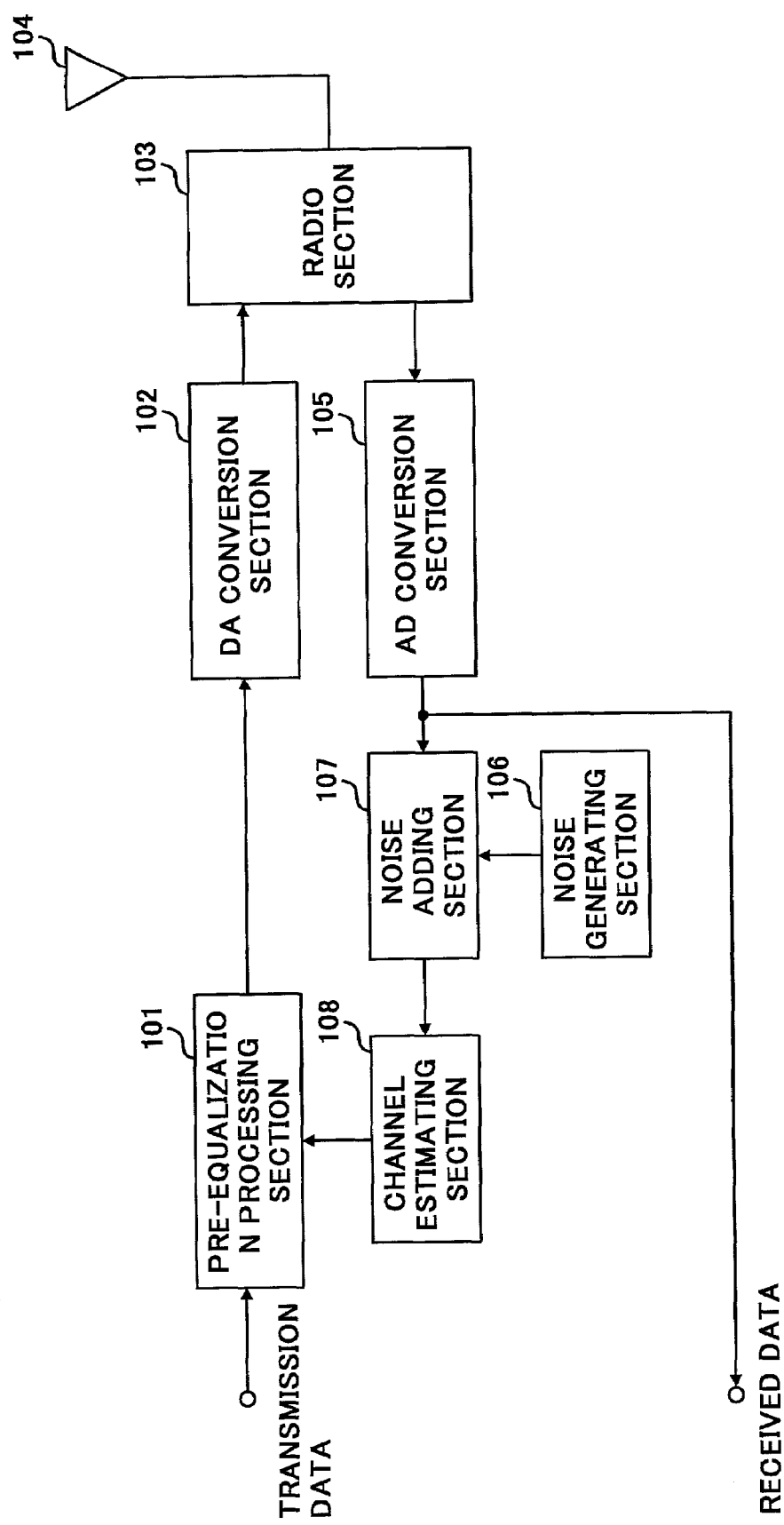
FIG. 3 is a block diagram illustrating a configuration of a radio communication apparatus according to a first embodiment of the present invention.

FIG. 3 is a block diagram illustrating a configuration of a radio communication apparatus according to the first embodiment of the present invention. It is a feature of radio communication apparatus 100 illustrated in FIG. 3 that a noise (white Gaussian noise) of some extent is added to a received signal (multipath noise), a preceding signal with a received level less than the noise level is disabled to be estimated, and that pre-equalization is performed using a delayed signal with a high received level as a desired signal.

Radio communication apparatus 100 is principally comprised of pre-equalization processing section 101, DA conversion section 102, radio section 103, antenna 104, AD conversion section 105, noise generating section 106, noise adding section 107, and channel estimating section 108.

A signal received at antenna 104 is subjected to the predetermined radio processing at radio section 103, and the resultant signal is converted into a digital signal at AD conversion section 105 to be output to noise adding section 107. Noise adding section 107 adds the digital signal converted in AD conversion section 105 and noise data generated in noise generating section 106 to output to channel estimating section 108. Channel estimating section 108 estimates a channel from the output signal of noise adding section 107, and outputs channel information to pre-equalization processing section 101.

It is herein assumed that, as illustrated in FIG. 4A, a received level of preceding signal 201 is less than added noise level 202. In this case, in channel estimating section 108, preceding signal 201 received with the level less than noise level 202 is disabled to be estimated, and delayed signal 203 is only estimated. As a result, pre-equalization processing section 101 performs the pre-equalization using delayed signal 203 as a desired signal. In this case, delayed signal 203 is delayed by time t1 with respect to preceding signal 201, and therefore the signal is transmitted the delay time t1 earlier.

It is thereby possible for a communication partner apparatus to receive a signal with the highest level at a synchronization time. Further, in the communication partner apparatus, as illustrated in FIG. 4C, preceding signal 201 is received before the synchronization time, however, a level of the signal 201 is sufficiently low as compared to delayed signal 203, whereby the reception characteristic dose not deteriorate.

Thus, according to the radio communication apparatus of the first embodiment, when a received level of a preceding signal is extremely lower than that of a delayed signal and is equal to or less than a noise level, the pre-equalization is performed using the delayed signal as a desired signal, whereby the reception characteristic in a communication partner apparatus does not deteriorate.

In addition, when there is a plurality of items of received data, each item of the received data is to a noise, whereby the same effectiveness as mentioned above can be obtained. Further, it may be possible to provide noise generating section 106 with a ROM with noise data stored therein as a noise source.

Second Embodiment

Figure 5:
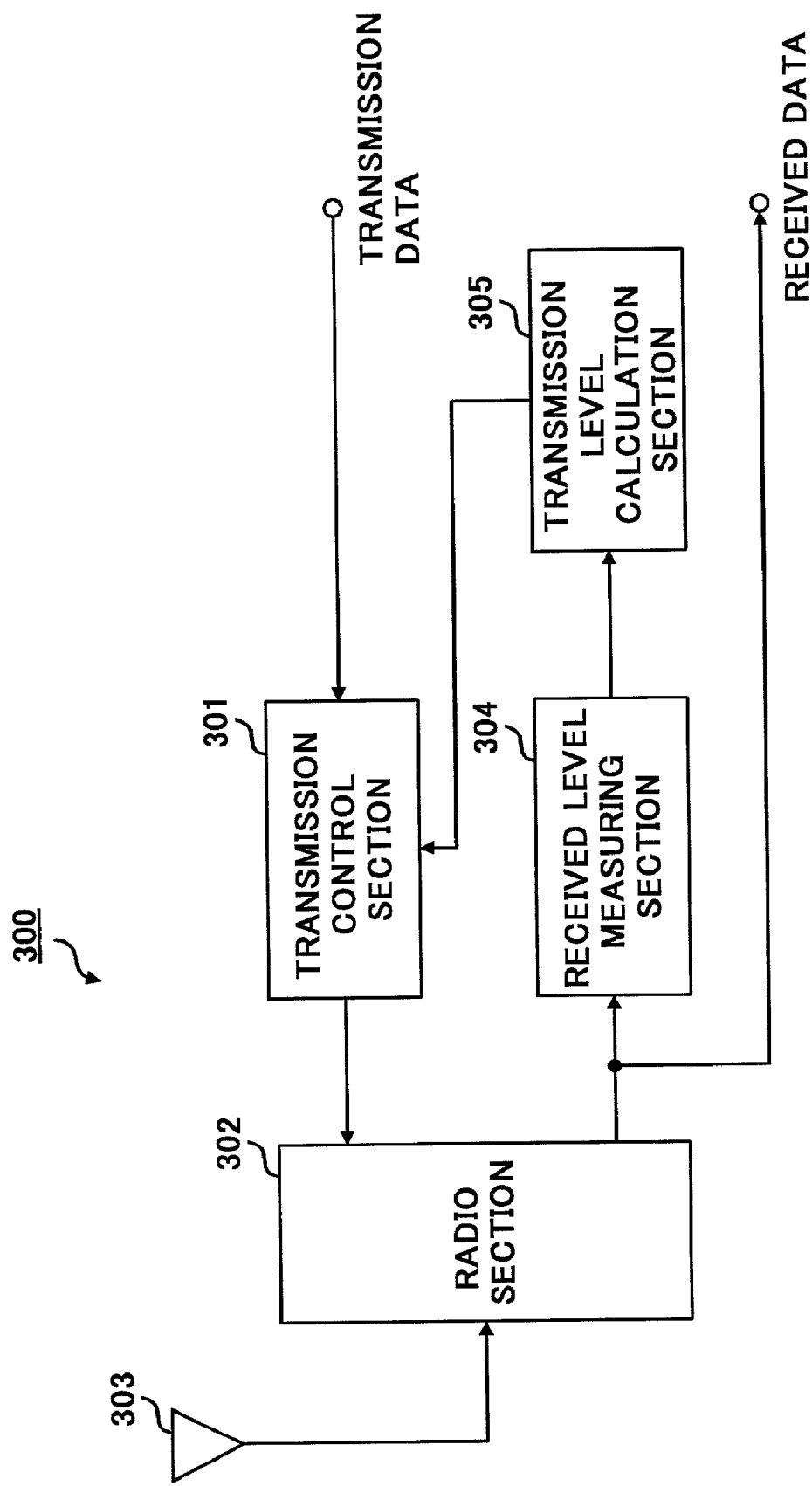
FIG. 5 is a block diagram illustrating a configuration of a radio communication apparatus according to a second embodiment of the present invention.

FIG. 5 is a block diagram illustrating a configuration of a radio communication apparatus according to the second embodiment of the present invention. It is a feature of radio communication apparatus 300 illustrated in FIG. 5 that the apparatus 300, which communicates with a communication partner that performs the pre-equalization, decreases a transmission output so that a received level of a preceding signal in the communication partner that performs the pre-equalization is lower than a noise level, when a received level of a preceding signal is extremely lower than that of a delayed signal and is equal to or less than a noise level.

Radio communication apparatus 300 is principally comprised of transmission control section 301, radio section 302, antenna 303, received level measuring section 304 and transmission level calculating section 305. A signal received at antenna 303 is subjected to coherent detection in radio section 302 to be output to received level measuring section 304.

Received level measuring section 304 measures received levels of a preceding signal and of a delayed signal and a noise level. In addition, in this case, received level measuring section 304 provides an interval at which the communication partner that performs the pre-equalization does not perform the pre-equalization, and measures received levels of preceding signals and delayed signals received during the interval.

When the received level of the preceding signal is sufficiently lower than that of the delayed signal, transmission level calculating section 305 calculates a transmission level such that the received level of the preceding signal is lower than the noise level. In this way in the communication partner that performs pre-equalization transmission, a level of a preceding signal is less than the noise level, and only the delayed signal can be detected.

Transmission control section 301 controls the transmit power of transmission data corresponding to the transmission level calculated in transmission level calculating section 305. The transmission data output from transmission control section 301 is upconverted in radio section 302 to be transmitted from antenna 303.

Thus, according to the radio communication apparatus of the second embodiment, when a received level of a preceding signal is extremely lower than that of a delayed signal, since the apparatus transmits data with a transmission level such that the received level of the preceding signal is lower than a noise level in a communication partner, the communication partner that performs the pre-equalization is not capable of detecting signals except the delayed signal. As a result, the communication partner performs the pre-equalization using the delayed signal as a desired signal, whereby the reception characteristic of the radio communication apparatus does not deteriorate. Further, since radio communication apparatus 300 decreases its transmission output, the apparatus is capable of reducing power consumption corresponding to the decrease.

In addition, it may be possible that the communication partner that performs the pre-equalization transmission is provided with received level measuring section 304 and transmission level calculating section 305, transmission level information is transmitted to a communication partner apparatus, and that the communication partner apparatus transmits transmission data with a level corresponding to the transmission level information.

Third Embodiment

Figure 6:
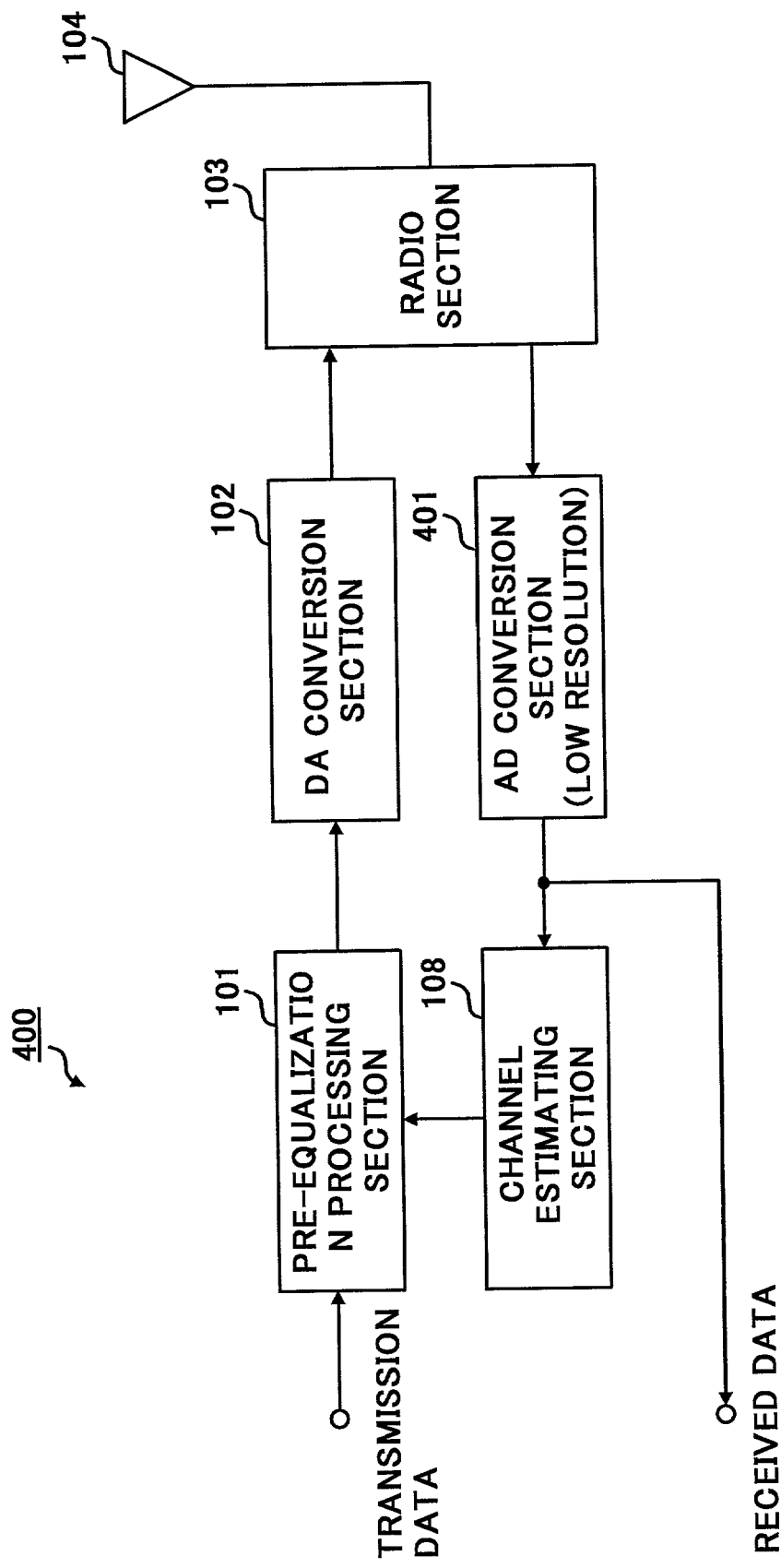
FIG. 6 is a block diagram illustrating a configuration of a radio communication apparatus according to a third embodiment of the present invention.

FIG. 6 is a block diagram illustrating a configuration of a radio communication apparatus according to the third embodiment of the present invention. It is a feature of radio communication apparatus 400 illustrated in FIG. 6 to perform sampling on a received signal with a low resolution. In addition, in radio communication apparatus 400 illustrated in FIG. 6, structural sections common to radio communication apparatus 100 illustrated in FIG. 3 are assigned the same reference numerals as in FIG. 3 to omit explanations thereof.

Radio communication apparatus 400 illustrated in FIG. 6 is different from radio communication apparatus 100 illustrated in FIG. 3 in points that noise generating section 106 and noise adding section 107 are eliminated, and that AD conversion section 105 is replaced with AD conversion section 401 with a low resolution.

A received signal output from radio section 103 is sampled with low-density bits in AD conversion section 401, thereby being converted into a digital signal. The sampling with low-dentistry bits is performed so that a level of a minimum resolution is equal to a noise level.

By thus performing the sampling, when a received level of a preceding signal is extremely lower than that of a delayed signal, it is possible to make the received level of a preceding signal equal to or less than a noise level.

In this way, when channel estimating section 108 performs channel estimation using received data converted in AD conversion section 401, the delayed signal is only estimated, and pre-equalization processing section 101 performs the pre-equalization using the delayed signal as a desired signal.

Thus, according to the radio communication apparatus of the third embodiment, when a received level of a preceding signal is extremely lower than that of a delayed signal and is equal to or less than a noise level, the pre-equalization with the delayed signal as a desired signal is performed, whereby the reception characteristic in a communication partner apparatus does not deteriorate. Further, since AD conversion section 401 performs the sampling with a low resolution, it is possible to decrease power consumption corresponding to the decreased resolution.

Fourth Embodiment

Figure 7:
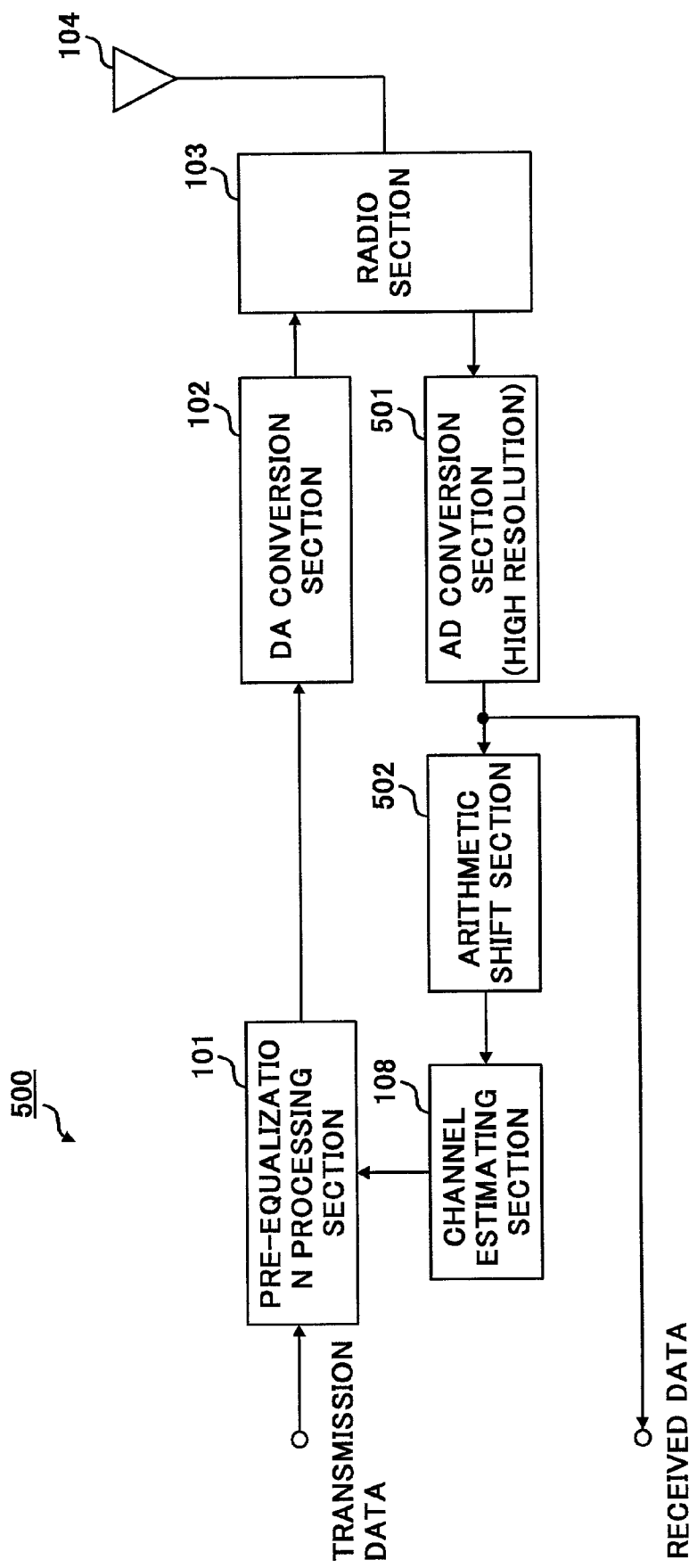
FIG. 7 is a block diagram illustrating a configuration of a radio communication apparatus according to a fourth embodiment of the present invention.

FIG. 7 is a block diagram illustrating a configuration of a radio communication apparatus according to the fourth embodiment of the present invention. It is a feature of radio communication apparatus 500 illustrated in FIG. 7 that a received signal is subjected to sampling with a high resolution and is further subjected to arithmetic right shift, and that the equalization is thereby performed on only a delayed signal. In addition, in radio communication apparatus 500 illustrated in FIG. 7, structural sections common to radio communication apparatus 400 illustrated in FIG. 6 are assigned the same reference numerals as in FIG. 6 to omit explanations thereof.

Radio communication apparatus 500 illustrated in FIG. 7 is different from radio communication apparatus 400 illustrated in FIG. 6 in points that AD conversion section 401 with a low resolution is replaced AD conversion section 501 with a high resolution, and that arithmetic shift section 502 is further provided.

A received signal output from radio section 103 is sampled with high-density bits in AD conversion section 501, thereby being converted into a digital signal. The high-resolution received data obtained by this conversion is subjected to the arithmetic right shift processing in arithmetic shift section 502 to be output to channel estimating section 108.

The arithmetic right shift processing is to shift data to an upper bit side, and to discard lower bits corresponding to the shift. According to this processing, high-resolution part of the data is abandoned, whereby in the similar way to performing the low-resolution AD conversion as explained in the third embodiment, a level of a minimum resolution after the shift is made equal to a noise level.

By thus performing the arithmetic right shift processing, when a received level of a preceding signal is extremely lower than that of a delayed signal, it is possible to make the received level of a preceding signal equal to or less than a noise level.

In this way, when channel estimating section 108 performs channel estimation using received data subjected to the arithmetic right shift processing in arithmetic shift section 502, the delayed signal is only estimated, and pre-equalization processing section 101 performs the pre-equalization using the delayed signal as a desired signal.

Thus, according to the radio communication apparatus of the fourth embodiment, when a received level of a preceding signal is extremely lower than that of a delayed signal and is equal to or less than a noise level, the pre-equalization with the delayed signal as a desired signal is performed, whereby the reception characteristic in a communication partner apparatus does not deteriorate.

Fifth Embodiment

Figure 8:
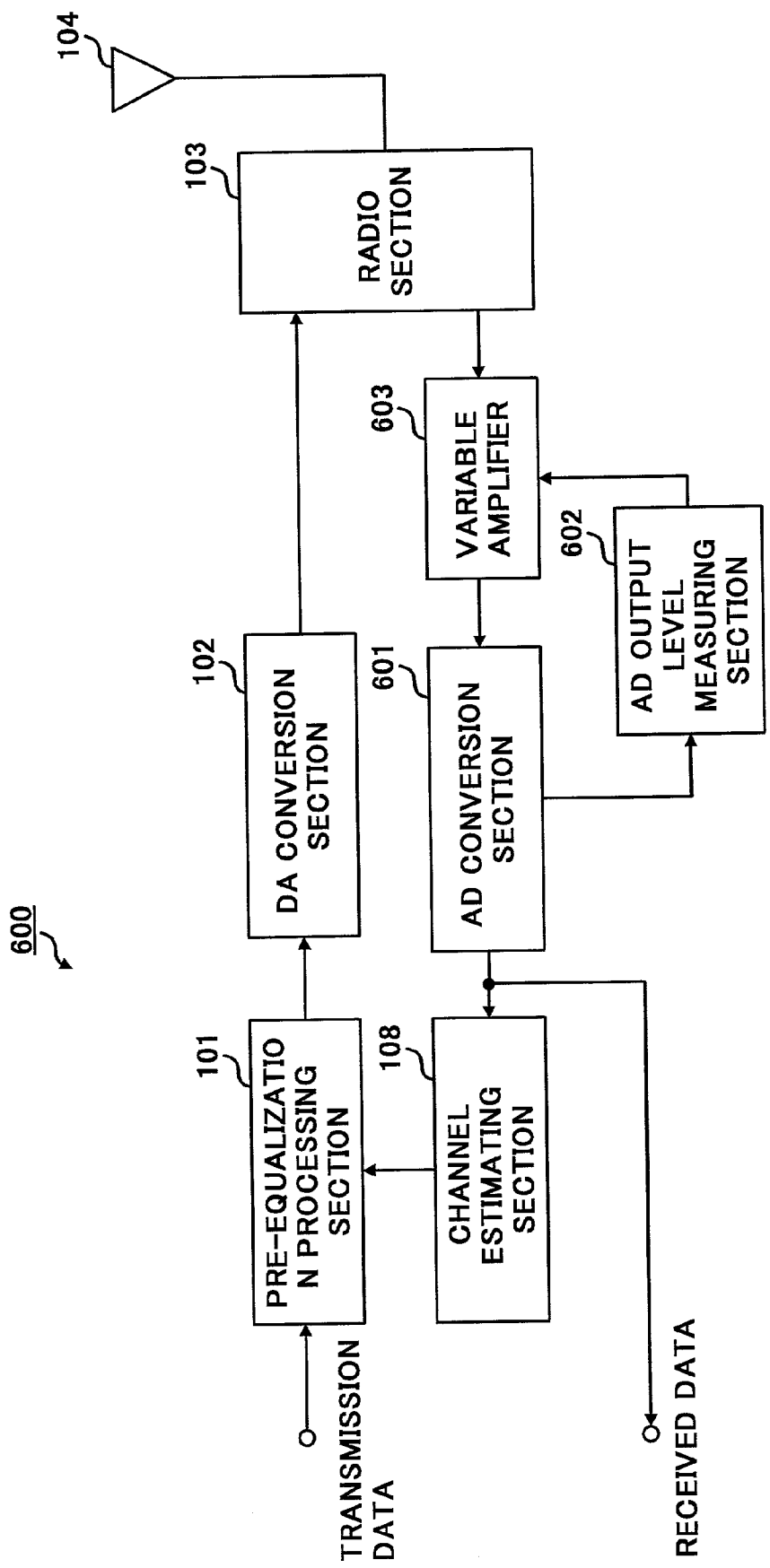
FIG. 8 is a block diagram illustrating a configuration of a radio communication apparatus according to a fifth embodiment of the present invention.

FIG. 8 is a block diagram illustrating a configuration of a radio communication apparatus according to the fifth embodiment of the present invention. It is a feature of radio communication apparatus 600 illustrated in FIG. 8 that a signal to be input to an AD conversion section is controlled so that a received signal is sampled in a low resolution range in the AD conversion section. In addition, in radio communication apparatus 600 illustrated in FIG. 8, structural sections common to radio communication apparatus 400 illustrated in FIG. 6 are assigned the same reference numerals as in FIG. 6 to omit explanations thereof.

Radio communication apparatus 600 illustrated in FIG. 8 is different from radio communication apparatus 400 illustrated in FIG. 6 in points that AD conversion section 401 with a low resolution is replaced with AD conversion section 601, and that AD output level measuring section 602 and variable amplifier 603 are further provided.

Variable amplifier 603 that amplifies a received signal undergoes gain adjustment based on gain information output from AD output level measuring section 602 so that its output level becomes a predetermined value. The adjusted and amplified received signal is output to AD conversion section 601.

AD output level measuring section 602 measures an output of AD conversion section 601, and generates the gain information based on the measured result. At this point, the section 602 generates the gain information so that a minimum resolution level of an output of AD conversion section 601 is equal to a noise level.

By thus performing the gain adjustment, when a received level of a preceding signal is extremely lower than that of a delayed signal, it is possible to make the received level of a preceding signal equal to or less than a noise level.

In this way, when channel estimating section 108 performs channel estimation using received data which has undergone the gain adjustment in variable amplifier 603 and then is output from AD conversion section 601, the delayed signal is only estimated, and pre-equalization processing section 101 performs the pre-equalization using the delayed signal as a desired signal.

Thus, according to the radio communication apparatus of the fifth embodiment, when a received level of a preceding signal is extremely lower than that of a delayed signal and is equal to or less than a noise level, the pre-equalization with the delayed signal as a desired signal is performed, whereby the reception characteristic in a communication partner apparatus does not deteriorate.

Sixth Embodiment

Figure 9:
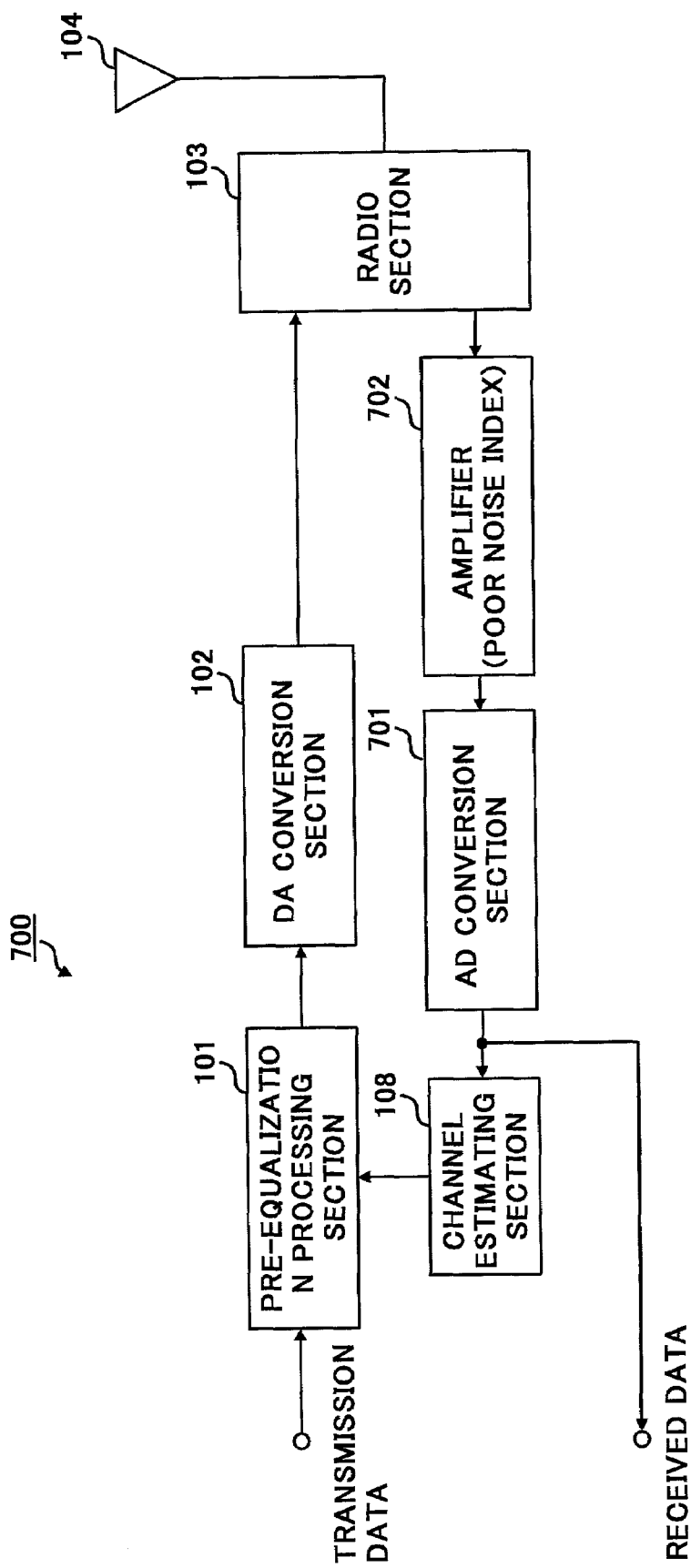
FIG. 9 is a block diagram illustrating a configuration of a radio communication apparatus according to a sixth embodiment of the present invention.

FIG. 9 is a block diagram illustrating a configuration of a radio communication apparatus according to the sixth embodiment of the present invention. It is a feature of radio communication apparatus 700 illustrated in FIG. 9 to use an amplifier with a poor noise index so as to increase a noise level multiplied on a received signal. In addition, in radio communication apparatus 700 illustrated in FIG. 9, structural sections common to radio communication apparatus 400 illustrated in FIG. 6 are assigned the same reference numerals as in FIG. 6 to omit explanations thereof.

Radio communication apparatus 700 illustrated in FIG. 9 is different from radio communication apparatus 400 illustrated in FIG. 6 in points that AD conversion section 401 with a low resolution is replaced with AD conversion section 701, and that amplifier 702 with a poor noise index is further provided.

A received signal output from radio section 103 is amplified in amplifier 702 with a poor noise index, and the resultant signal is converted into a digital signal in AD conversion section 701 to be output to channel estimating section 108. By amplifying a received signal with amplifier 702 with a poor noise index, a preceding signal whose received level is low is buried in the noise, whereby channel estimating section 108 estimates only a delayed signal, and pre-equalization processing section 101 performs the pre-equalization with the delayed signal as a desired signal.

Thus, according to the radio communication apparatus of the sixth embodiment, when a received level of a preceding signal is extremely lower than that of a delayed signal and is equal to or less than a noise level, the pre-equalization with the delayed signal as a desired signal is performed, whereby the reception characteristic in a communication partner apparatus does not deteriorate.

Seventh Embodiment

Figure 10:
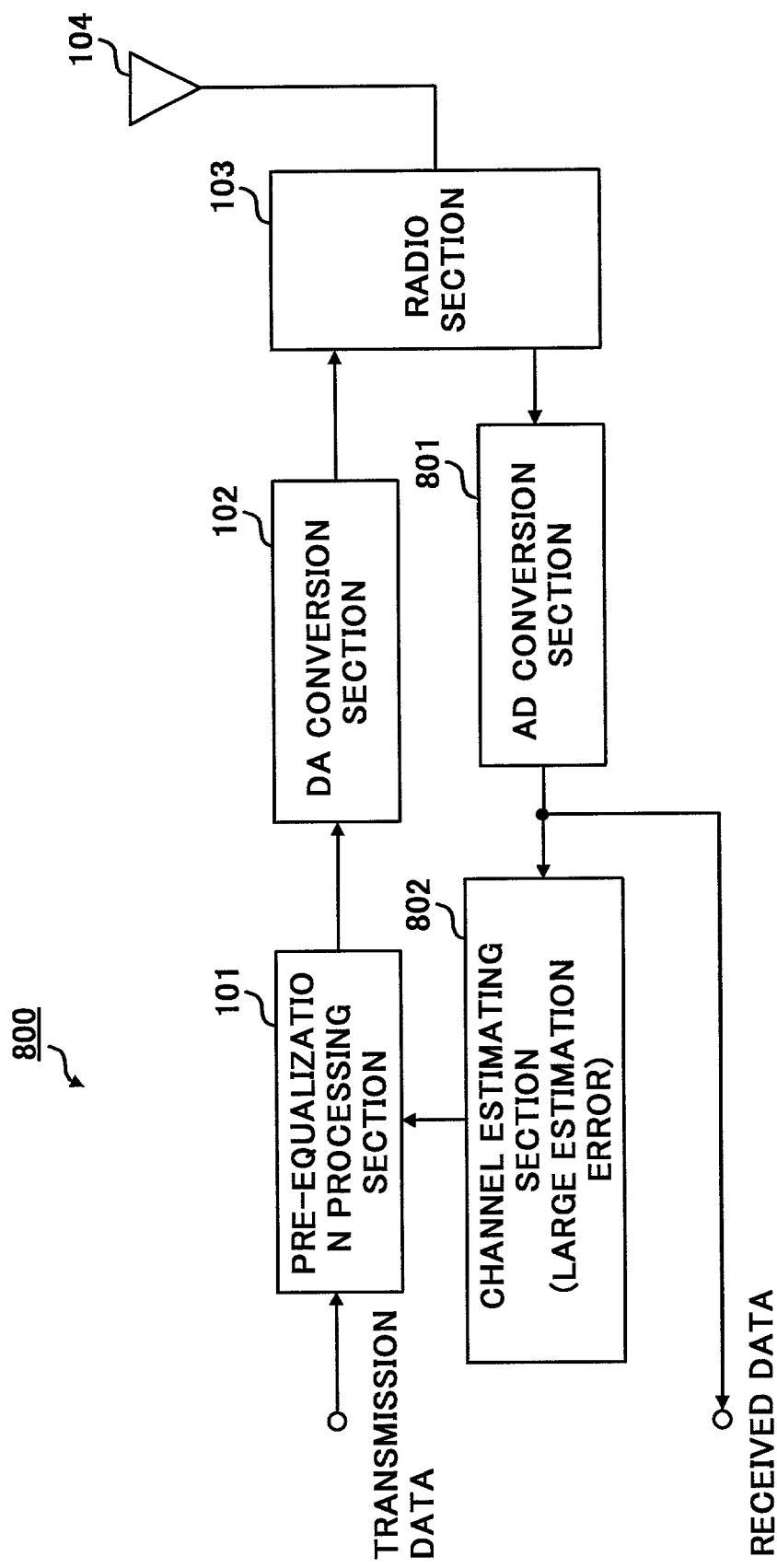
FIG. 10 is a block diagram illustrating a configuration of a radio communication apparatus according to a seventh embodiment of the present invention.

FIG. 10 is a block diagram illustrating a configuration of a radio communication apparatus according to the seventh embodiment of the present invention. It is a feature of radio communication apparatus 800 illustrated in FIG. 10 that an algorithm with a large estimation error is applied as an algorithm of a channel estimating section. In addition, in radio communication apparatus 800 illustrated in FIG. 10, structural sections common to radio communication apparatus 400 illustrated in FIG. 6 are assigned the same reference numerals as in FIG. 6 to omit explanations thereof.

Radio communication apparatus 800 illustrated in FIG. 10 is different from radio communication apparatus 400 illustrated in FIG. 6 in points that AD conversion section 401 with a low resolution is replaced with AD conversion section 801, and that channel estimating section 108 is replaced with channel estimating section 802 with a large estimation error.

A received signal output from radio section 103 is converted into a digital signal in AD conversion section 801, and the resultant signal is output to channel estimating section 802. Channel estimation section 802 applies an algorithm with a large estimation error such as LMS algorithm. Since the algorithm with a large estimation error has a less calculation amount than an algorithm with a small estimation error, a signal with a small level such as a noise level is not estimated, and an error level remains in a channel estimation value to some extent. When the error level is larger than a received level of a preceding signal, the channel information of the preceding signal is equal to the remaining error, whereby channel estimating section 802 estimates only a delayed signal, and pre-equalization processing section 101 performs the pre-equalization equivalent to that with the delayed signal as a desired signal.

Thus, according to the radio communication apparatus of the seventh embodiment, when a received level of a preceding signal is extremely lower than that of a delayed signal and is equal to or less than a noise level, the pre-equalization with the delayed signal as a desired signal is performed, whereby the reception characteristic in a communication partner apparatus does not deteriorate. Further, since the algorithm with a small calculation amount is used, it is possible to decrease a calculation amount in the channel estimation in the channel estimating section.

Eighth Embodiment

Figure 11:
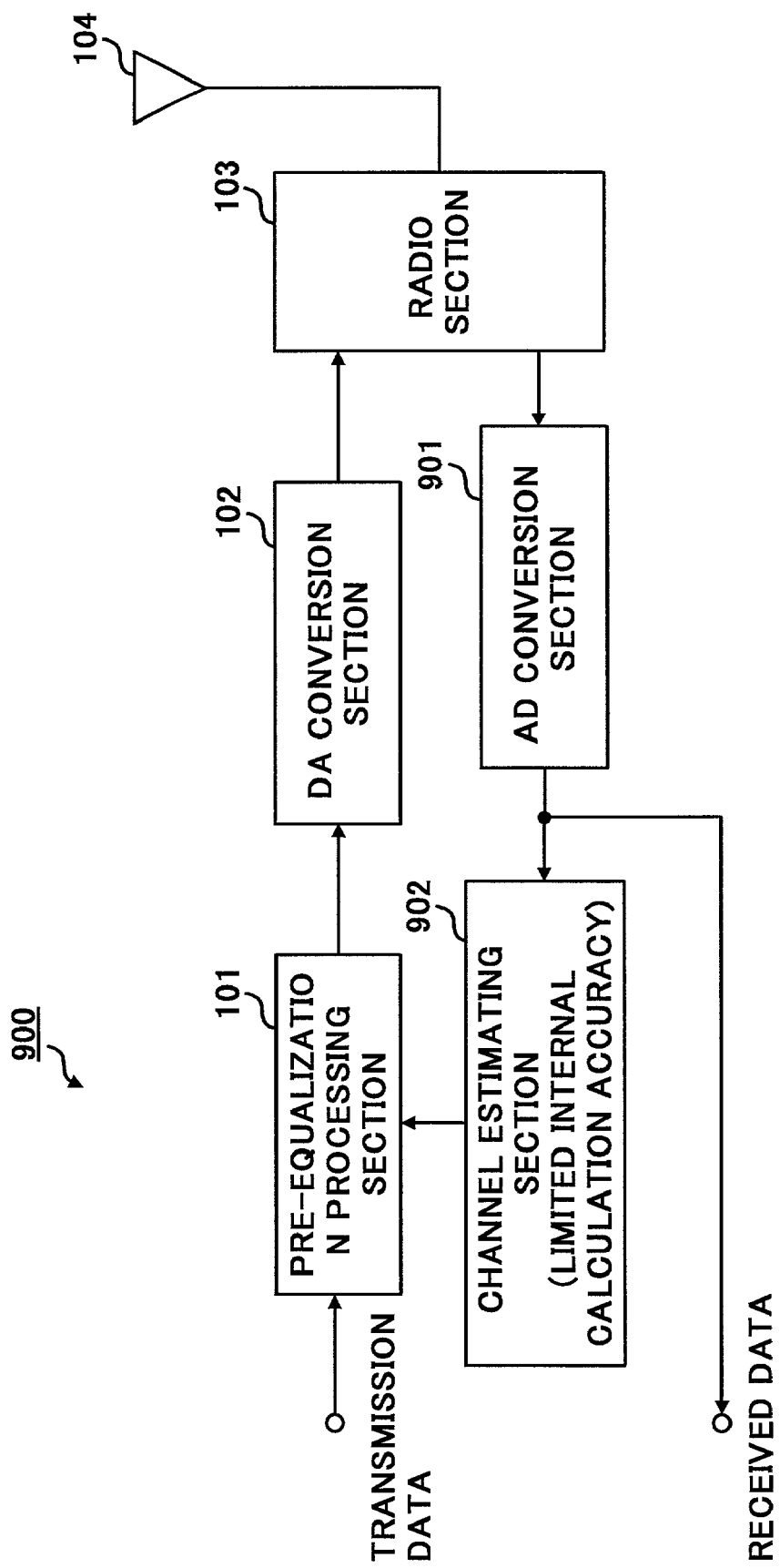
FIG. 11 is a block diagram illustrating a configuration of a radio communication apparatus according to an eighth embodiment of the present invention.

FIG. 11 is a block diagram illustrating a configuration of a radio communication apparatus according to the eighth embodiment of the present invention. It is a feature of radio communication apparatus 900 illustrated in FIG. 11 that an algorithm of the channel estimating section is limited in internal calculation accuracy so that an estimation error is intentionally increased. In addition, in radio communication apparatus 900 illustrated in FIG. 11, structural sections common to radio communication apparatus 400 illustrated in FIG. 6 are assigned the same reference numerals as in FIG. 6 to omit explanations thereof.

Radio communication apparatus 900 illustrated in FIG. 11 is different from radio communication apparatus 400 illustrated in FIG. 6 in points that AD conversion section 401 with a low resolution is replaced with AD conversion section 901, and that channel estimating section 108 is replaced with channel estimating section 902 with a limited internal calculation accuracy.

A received signal output from radio section 103 is converted into a digital signal in AD conversion section 901, and the resultant signal is output to channel estimating section 902. Channel estimation section 902 performs calculation with the limited internal calculation accuracy, whereby even when an algorithm with a small estimation error such as RLS algorithm is applied, the internal calculation accuracy is limited, and an error level remains in a channel estimation value to some extent. When the error level is larger than a received level of a preceding signal, the channel information of the preceding signal is equal to the remaining error, whereby channel estimating section 902 estimates only a delayed signal, and pre-equalization processing section 101 performs the pre-equalization equivalent to that with the delayed signal as a desired signal.

Thus, according to the radio communication apparatus of the eighth embodiment, when a received level of a preceding signal is extremely lower than that of a delayed signal and is equal to or less than a noise level, the pre-equalization with the delayed signal as a desired signal is performed, whereby the reception characteristic in a communication partner apparatus does not deteriorate. Further, it is possible to decrease a calculation amount in the channel estimation in the channel estimating section corresponding to the limitation in the internal calculation accuracy.

In addition, in each of the above-mentioned embodiments, constructing the channel estimating section by hardware enables the reduction of circuit scale, and thereby enables the miniaturization and the reduction of power consumption.

As described above, according to the present invention, when a received level of a preceding signal is extremely lower than that of a delayed signal and a noise level is further smaller than the received level of the preceding signal, it is possible to perform the pre-equalization using a delayed signal as a desired signal, and therefore it is possible to maintain the reception characteristic of a communication partner.

The present invention is not limited to the above described embodiments, and various variations and modifications may be possible without departing from the scope of the present invention.

This application is based on the Japanese Patent Application No. 2000-260833 filed on Aug. 30, 2000, entire content of which is expressly incorporated by reference herein.

What is claimed is:

1. A radio communication apparatus comprising:
   generating means for generating noise data of a white Gaussian noise;
   adding means for adding received data and the noise data;
   channel estimating means for performing channel estimation using the received data with the noise data added; and
   pre-equalization processing means for performing pre-equalization on transmission data based on a result of the channel estimation in said channel estimating means.

2. A communication terminal apparatus having a radio communication apparatus, said radio communication apparatus comprising:
   generating means for generating noise data of a white Gaussian noise;
   adding means for adding received data and the noise data;
   channel estimating means for performing channel estimation using the received data with the noise data added; and
   pre-equalization processing means for performing pre-equalization on transmission data based on a result of the channel estimation in said channel estimating means.

3. A base station apparatus having a radio communication apparatus, said radio communication apparatus comprising:
   generating means for generating noise data of a white Gaussian noise;
   adding means for adding received data and the noise data;
   channel estimating means for performing channel estimation using the received data with the noise data added; and
   pre-equalization processing means for performing pre-equalization on transmission data based on a result of the channel estimation in said channel estimating means.

4. A pre-equalization processing method, comprising:
   generating noise data of a white Gaussian noise;
   adding received data and the noise data; and
   performing channel estimation using the received data with the noise data added; and
   performing pre-equalization on transmission data based on the channel estimated result.

* * * * *